United States Patent
Tani et al.

(10) Patent No.: US 9,293,771 B2
(45) Date of Patent: Mar. 22, 2016

(54) ANODE FOR SECONDARY BATTERY, ANODE CURRENT COLLECTOR, PRODUCTION METHOD THEREOF, AND SECONDARY BATTERY

(71) Applicant: FURUKAWA ELECTRIC CO., LTD., Chiyoda-ku, Tokyo (JP)

(72) Inventors: Toshio Tani, Tokyo (JP); Kiyoshi Yoshinari, Tokyo (JP); Akitoshi Suzuki, Tokyo (JP); Kensaku Shinozaki, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 299 days.

(21) Appl. No.: 13/729,470

(22) Filed: Dec. 28, 2012

(65) Prior Publication Data

US 2013/0115510 A1    May 9, 2013

Related U.S. Application Data

(63) Continuation of application No. PCT/JP2011/064632, filed on Jun. 27, 2011.

(30) Foreign Application Priority Data

Jun. 30, 2010    (JP) .................................. 2010-148612

(51) Int. Cl.
*H01M 4/66*    (2006.01)
*H01M 4/04*    (2006.01)
(Continued)

(52) U.S. Cl.
CPC ............ *H01M 4/661* (2013.01); *H01M 4/0404* (2013.01); *H01M 4/134* (2013.01);
(Continued)

(58) Field of Classification Search
CPC ........................... H01M 4/661; H01M 4/0404
USPC ............. 429/199, 211; 205/640, 205; 427/58, 427/585
See application file for complete search history.

(56) References Cited

U.S. PATENT DOCUMENTS

2003/0027050 A1    2/2003    Okamoto et al.
2004/0161670 A1    8/2004    Kawase et al.
(Continued)

FOREIGN PATENT DOCUMENTS

CN    1710737 A    12/2005
CN    2008-10008295    8/2008
(Continued)

OTHER PUBLICATIONS

International Search Report for PCT/JP2010/064632 mailed Sep. 13, 2011.
(Continued)

*Primary Examiner* — Stewart Fraser
*Assistant Examiner* — Rachel Zhang
(74) *Attorney, Agent, or Firm* — Hauptman Ham, LLP (57) ABSTRACT

A chargeable and dischargeable secondary battery for use in electronic devices, industrial machines, electric-powered vehicles, is provided, along with an anodic electrode and a copper foil for anode current collector.
It is an anode for secondary battery that utilizes non-aqueous electrolyte, which comprises a silicon-type active material film formed on one side or both sides of a current collector made of copper foil or copper alloy foil, wherein 1 g/m² to 14 g/m² of silicon-type active material film is formed on said current collector, and the lightness Y value in a XYZ colorimetric system (CIE 1931 standard colorimetric system) for the surface of said anode, onto which said silicon-type active material film is formed, is 15 to 50, and the surface roughness (ten point average roughness) Rz specified by the Japanese Industrial Standards (JIS B0601-1994 ten point average roughness) is 1.0 μm or more and 4.5 μm or less.

10 Claims, 2 Drawing Sheets

(51) Int. Cl.
　　　*H01M 4/134* 　　(2010.01)
　　　*H01M 4/1395* 　(2010.01)
　　　*H01M 4/36* 　　 (2006.01)
　　　*H01M 4/70* 　　 (2006.01)
　　　*H01M 10/052* 　(2010.01)

(52) U.S. Cl.
　　　CPC ............ *H01M4/1395* (2013.01); *H01M 4/364* (2013.01); *H01M 4/70* (2013.01); *H01M 10/052* (2013.01); *Y02E 60/122* (2013.01); *Y02T 10/7011* (2013.01)

(56) References Cited

U.S. PATENT DOCUMENTS

| | | |
|---|---|---|
| 2008/0176144 A1 | 7/2008 | Iwama et al. |
| 2009/0111031 A1* | 4/2009 | Hirose et al. ................. 429/332 |
| 2010/0104951 A1 | 4/2010 | Iwama et al. |
| 2012/0214073 A1* | 8/2012 | Iwaya et al. ................. 429/338 |

FOREIGN PATENT DOCUMENTS

| | | |
|---|---|---|
| CN | 2008-10135637 | 1/2009 |
| CN | 101692504 A | 4/2010 |
| JP | 2001-015100 A | 1/2001 |
| JP | 2002-319408 A | 10/2002 |
| JP | 3581784 B2 | 10/2004 |
| JP | 3935067 B2 | 6/2007 |
| JP | 2008-010320 A | 1/2008 |
| JP | 2009-110846 A | 5/2009 |
| JP | 2010-103006 A | 5/2010 |
| JP | 2010-182620 A | 8/2010 |
| TW | 089122034 | 12/2002 |
| WO | 2010128681 A1 | 11/2010 |

OTHER PUBLICATIONS

Office Action issued Jun. 27, 2014, corresponds to Chinese patent application No. 201180009749.7.
International Preliminary Report on Patentability for PCT/JP2011/64632 on Jun. 27, 2011.
Office Action for Application No. CN100122832 on Jul. 22, 2013.

* cited by examiner

ANODE FOR SECONDARY BATTERY, ANODE CURRENT COLLECTOR, PRODUCTION METHOD THEREOF, AND SECONDARY BATTERY

TECHNICAL FIELD

The present invention relates to an anodic electrode and an anode current collector, which are used in chargeable and dischargeable secondary batteries, especially lithium ion secondary batteries that utilize non-aqueous electrolyte.

BACKGROUND ART

In recent years, with the mobilization and high functionality of electronic equipments, the secondary battery, which is a power source, has become one of the most important parts. In particular, lithium (Li) ion secondary battery has become the mainstream in place of conventional NiCd battery and Ni—H battery, due to its high energy density obtained from the high voltage of the cathode active material and anode active material. However, Li-ion secondary battery by the combination of lithium cobalt oxide ($LiCoO_2$)-type cathode active material and carbon-type anode active material mainly composed of graphite, which is currently used as standard Li-ion battery, is incapable of sufficiently supplying the amount of electricity required for today's high-functionality high-intensity electronic parts at a length of time, and is not able to fulfill the required performance as a portable power source. The theoretical electrochemical specific capacity of the cathode active material is generally small, and even those prospective new materials for future practical use remain to be of smaller values than the theoretical specific capacity of the current carbon-type anode active material. Further, the carbon-type anode, of which its performance has been rising little by little every year, is also approaching the theoretical specific capacity, and it is becoming impossible to anticipate large improvement in voltage source capacity with the current combination of cathode and anode active materials. There appears to be a limitation in meeting requirements for high-functionality and long mobile running of electronic devices, for loading on to industrial applications such as electric power tools, uninterruptible power sources, and electric storage devices, for which adoption is spreading, or for electric-powered vehicles.

Under such circumstances, metal-type anode active materials are being examined for application, as a method to dramatically increase the electric capacity than that currently possible, in place of the carbon (C)-type anode active material. Such method enables several to ten times the theoretical specific capacity of the current C-type anode. These utilize germanium (Ge), tin (Sn), and silicon (Si)-type materials as the anode active material. In particular, Si has a specific capacity that is comparable to that of metallic Li, which is said to be difficult to put to practical use, and is thus, being the center of study. Incidentally, the basic performance expected of a secondary battery is that the electric capacity retained by charging is large, and that this electric capacity is maintained as much as possible, even after usage cycles where charge and discharge is repeated. Even if its initial charge capacity is large, if the chargeable capacity or dischargeable capacity decreases immediately after repeated charge and discharge, its operation life is short, and its value as a secondary battery becomes low. However, in Si and other metal-type anode active materials, there is a problem in that their charge-discharge life is short. The cause of such problem lies in that the adherence between the current collector and the active material is small, and thus, as a means to solve this problem, specification of the surface configuration of the current collector, as well as compositions wherein the current collector component is diffused into or alloyed with the active material film, are being used (for example, see Patent Document 1 or 2). Further, by understanding the relationship between the dielectric layer on the surface of the current collector copper foil and the inverse of the electric double layer, the present inventors invented the copper foil for anode current collector for secondary battery (see Patent Document 3).

PRIOR ART DOCUMENTS

Patent Documents

[Patent Document 1] JP-A-2002-319408
[Patent Document 2] JP-B-3935067
[Patent Document 3] JP-B-3581784

SUMMARY OF THE INVENTION

Technical Problem

However, with the invention described in Patent Documents 1 to 2, the improvement of a charge-discharge cycle characteristic is insufficient, and practical utilization is not in prospect. Further, the substrate current collector and the diffusion alloy phase of the metal-type film do not contribute to the charge capacity in lithium ion battery, and there was also a flaw in that the property of the high specific capacity active material deteriorated.

Thus, the present invention relates to an anode, which comprises anode active materials such as Si, directly formed on an anode current collector, and a secondary battery that utilize this, and its object is to provide an anode, an anode current collector, and secondary battery, which can obtain high capacity at charge and discharge, while inhibiting the decrease in capacity due to repeated cycles, more than were conventionally possible.

Means for Solving the Problem

The present inventors, by defying the boundaries of conventional perceptions, examined the number of charge-discharge cycles, capacity, and the configuration of the anode material composition, especially for Li ion batteries. As a result, the present inventors discovered that, although conventional knowledge of the current collector surface configuration could seldom improve the cycle characteristic, the surface configuration of the active material formed on the current collector surface greatly influence the cycle characteristic. By using a certain Si-type anode active material with a certain surface configuration as the anode, a large charge and discharge capacity, which it inherently has, can definitely be obtained. Further, it was also discovered that under such good adherence between the charge collector and the active material, countless micro-sites, which is attained by the surface configuration of the anode, and allow insertion and desorption of Li ion into the active material, enable a long period of charge and discharge cycle to be maintained. It was thus discovered that the surface configuration of the active material formed is important, rather than the specification of the surface of the charge collector, as conventionally believed, and that a large surface area and a moderately rough surface configuration is preferable.

By understanding and observing the relationships among the surface configuration of the active material formed, the size of the surface area, and the moderately rough surface configuration, the number of charge and discharge cycles of the secondary battery and the charge-discharge capacity, the present inventors devised that conventional problems of battery characteristic can be solved. Thus, the present invention was made based on such knowledge. As a result of detailed studies, it was revealed that in active material films that enable a relatively long cycle life, such long cycle life can be observed as an effect of the roughened configuration and irregularities of the electrode surface, as well as of the voids obtained by them. Thus the relationship between a parameter that represent such roughened surface configuration, and anodes or anode current collectors that show remarkable charge and discharge characteristics, was revealed.

Hence, the present invention provides the following inventions:

(1) An anode for secondary battery that utilizes non-aqueous electrolyte, which comprises a silicon-type active material film formed on one side or both sides of a current collector made of copper foil or copper alloy foil; wherein 1 $g/m^2$ to 14 $g/m^2$ of silicon-type active material film is formed on said current collector; and the lightness Y value in a XYZ colorimetric system (CIE 1931 standard colorimetric system) for the surface of said anode, onto which said silicon-type active material film is formed, is 15 to 50, and the surface roughness (ten point average roughness) Rz specified by the Japanese Industrial Standards (JIS B0601-1994 ten point average roughness) is 1.0 µm or more and 4.5 µm or less.

(2) The anode for secondary battery according to (1), wherein said silicon-type active material film contains phosphorus and/or oxygen.

(3) The anode for secondary battery according to (1), wherein said silicon-type active material film further contains hydrogen.

(4) The anode for secondary battery according to (1), which comprises at least one heat-resistant layer comprising at least a layer containing 0.01 to 0.2 $g/m^2$ of nickel or a layer containing 0.003 to 0.05 $g/m^2$ of zinc on the surface of said current collector, on which said silicon-type active material film is to be formed.

(5) The anode for secondary battery according to (4), wherein an anti-corrosion layer and/or a silane coupling treatment layer is formed on top of said heat-resistant layer, and said silicon-type active material film is further formed on top of said layer(s).

(6) The anode for secondary battery according to (4), wherein the zinc in said heat-resistant layer is diffused into said current collector, said nickel layer, or said silicon-type active material film.

(7) An anode current collector for secondary battery, characterized in that it is made of copper foil or copper alloy foil, and is a current collector for an anode for secondary battery that utilizes non-aqueous electrolyte, to which a silicon-type active material film is formed on one side or both sides; wherein the tensile strength of said current collector is 300 MPa or more and 1000 MPa or less, the lightness Y value in a XYZ colorimetric system (CIE 1931 standard colorimetric system) of the surface, on which said silicon-type active material film is to be formed, is 10 to 40, and the surface roughness (ten point average roughness) Rz specified by the Japanese Industrial Standards (JIS B0601-1994 ten point average roughness) is 2.0 µm or more and 5.0 µm or less.

(8) An anode current collector for secondary battery, characterized in that: it is made of copper foil or copper alloy foil, and is a current collector for an anode for secondary battery that utilizes non-aqueous electrolyte, to which a silicon-type active material layer is formed by coating and solidifying a slurry of active material particulates on one side or both sides, wherein the tensile strength of said current collector is 300 MPa or more and 1000 MPa or less, the lightness Y value in a XYZ colorimetric system (CIE 1931 standard colorimetric system) of the surface, onto which said silicon-type active material layer is formed, is 20 to 50, and the surface roughness (ten point average roughness) Rz specified by the Japanese Industrial Standards (JIS B0601-1994 ten point average roughness) is 0.6 µm or more and 3.5 µm or less.

(9) The anode current collector for secondary battery according to (7) or (8), which further comprises: a heat-resistant layer comprising at least a layer containing 0.01 to 0.2 $g/m^2$ of nickel, or a layer containing 0.003 to 0.05 $g/m^2$ of zinc, on the surface of said current collector, on which said active material film is to be formed.

(10) The anode current collector according to (9), wherein an anti-corrosion layer and/or a silane coupling treatment layer are formed on top of said heat-resistant layer.

(11) A secondary battery that utilizes non-aqueous electrolyte, which comprises the use of the anode according to (1), or the anode current collector according to (7) or (8).

(12) The secondary battery according to (11), which utilizes an electrolyte solution comprising a non-aqueous solvent containing fluoride.

(13) A method for producing an anode for secondary battery that utilizes non-aqueous electrolyte, wherein a silicon-type active material film or active material layer is formed on one or both sides of the anode current collector of (7) or (8), which comprises a process of forming 1 $g/m^2$ to 14 $g/m^2$ of a silicon-type active material film or active material layer containing at least silicon, or silicon with phosphorus, oxygen, or hydrogen, on said anode current collector.

(14) The method for producing an anode for secondary battery of (13), wherein: said silicon-type active material film is formed by a CVD (chemical vapor deposition) method, an EB (electron beam) vapor depositing method, or a sputtering method; and said silicon-type active material layer is formed by slurry application-calcination method.

(15) The method for producing an anode for secondary battery of (13), wherein the lightness Y value in a XYZ colorimetric system (CIE 1931 standard colorimetric system) of the anode surface, on which said silicon-type active material film is formed, is 15 to 50, and the surface roughness (ten point average roughness) Rz specified by the Japanese Industrial Standards (JIS B0601-1994 ten point average roughness) is 1.0 µm or more and 4.5 µm or less.

(16) A method for producing the anode current collector for secondary battery using non-aqueous electrolyte according to (7) or (8), which comprises: a process of performing electroplating on an active material formation side of a copper foil for current collector substrate with a tensile strength of 300 MPa or more and 1000 MPa or less, to thereby obtain a roughened surface configuration.

(17) The method for producing an anode current collector for secondary battery according to (16), which comprises a process of forming a heat-resistant layer that contains at least nickel or zinc on the roughened surface of said active material formation side.

(18) The method for producing an anode current collector for secondary battery according to (17), which further comprises a process of forming an anti-corrosion layer and/or a silane coupling layer on top of said heat-resistant layer.

Effect of the Invention

The anode for secondary battery of the present invention specifies the thickness of the silicon-type active material film formed on the surface of a current collector substrate, for which copper foil is used. Since the parameter and range of the fine surface configuration are specified by the lightness Y value in a XYZ colorimetric system, which can be considered a parameter for the surface configuration and the size of the actual surface area, including the microscopic voids of the fine roughened surface configuration of the electrode on which the film is formed. Thus, the large actual capacity and the reaction site for Li ion and the active material during charge and discharge is secured and electrochemical alloying and de-alloying of Li ion can take place without hindrance due to volume expansion and contraction. As a result, there is an effect in that the ratio of decrease in charge and discharge capacity, even after long repeated cycles, is smaller compared to that conventionally possible. Since the active material film contains silicon, high capacity is obtained. Furthermore, since silicon films obtained by the CVD method and electron beam evaporation method, etc. are used, even though the surface is rough, a uniform homogeneous active material film can be formed, which is industrially economical. Further, since an active material layer that is obtained by applying and calcinating a slurry can also be used, it is highly economical. Also, by adding phosphorus and oxygen or hydrogen to the silicon-type active material, the conductivity and the current collectivity of the active material and the entire electrode improve. Further, since atoms with similar to larger atomic radii exist between the silicon atoms, the lattice and atomic interval expand. Thus, Li ion, which has a large atomic radius and large ionic radius, can easily be inserted for alloying or desorbed for de-alloying, and excellent charge and discharge cycle life, as well as excellent charge and discharge characteristics at high rate, are obtained. Furthermore, by forming a heat-resistant layer and an anti-corrosion layer, as well as a silane coupling treatment layer, on the copper foil constituting the current collector, the ability to prevent time degradation until the formation of active material, and heat resistance under high temperature environment during film formation, can be maintained. Also, the adhesion between the active material film formed and the current collector surface improves. Moreover, such layers suppress the copper component in the current collector from diffusing into the silicon-type active material film, the decrease in charge and discharge capacity due to diffusion alloying of the active material with copper can be prevented, thus allowing high specific capacity that is inherent to silicon to be obtained. The secondary battery that utilizes the above described anode can obtain high capacity and long service life. Further, by using an electrolyte comprising a non-aqueous solvent containing fluorine, a secondary battery, in which degradation of capacity at repeated charge and discharge is much lower, can be obtained.

BEST MODE FOR CARRYING OUT THE INVENTION

Copper foil or copper alloy foil is used as the substrate of the current collector (current collector substrate) used in the anode electrode for secondary battery of the present invention. Since the volume of the active material expands or contracts by the insertion or desorption of Li ion during charge and discharge, it is preferred to use a copper foil that has a tensile strength of 300 MPa to 1000 MPa, so that it can resist elongation caused by charge and discharge, without breaking. Further, for the copper foil used as the current collector substrate, only a copper foil that has a surface that is not smooth and shiny, but rather rough, at least on the side onto which the active material is to be formed, should be used. Such rough surfaces may be formed on one side or both sides of the copper foil. There are two types of copper foils, the electrolytic copper foil and the rolled copper foil. For the rolled copper foil, since it is a smooth foil with two shiny sides, surface roughening process by such methods as etching, plating, etc. is required, at least on the side which active material is to be formed. The same can be said for the electrolytic copper foil, if both sides are shiny. The rolled copper foil can be produced with a predetermined thickness by, for example, performing known processes of hot-rolling, cold-rolling, homogenizing, and degreasing to an ingot obtained by melting and casting pure copper material. As for the electrolytic copper foil, original foil of copper foil for printed circuits can be used as a substrate of copper foil, which is produced by immersing part of a stainless steel-made or titanium-made rotation drum into an acidic electrolyte of sulfuric acid and copper ion, performing electrolytic reduction, then continuously exfoliating and rolling the copper foil that is electro-deposited thereto. A predetermined foil thickness can be obtained by controlling the electrolytic current and the rotational speed of the drum. For the electrolytic copper foil, although the electrodeposition-side of the rotation drum (the rotation drum side) is always shiny and smooth, the electrolyte-side can either be rough or shiny and smooth. If the side is rough, the foil can be used as it is for the present invention, and may be used as the active material formation-side relatively well, but for the use in batteries wherein active materials are required to be formed on both side, it is not suitable, as the battery characteristic would differ between the two sides. It is desirable to use a copper foil that has two roughened sides of approximately equal roughness, obtained by performing a surface roughening process on a double-smooth-sided foil. When active materials are to be formed on both sides, both types of copper foils must undergo a surface roughening process on at least one side. As for such surface roughening process, the following can be applied: etching methods such as AC etching using chlorine ion-containing electrolyte; and plating methods such as conventional copper electroplating using current density around the critical current density in copper sulfate-type electrolyte, which is applied to copper foil for printed circuits, in order to electrodeposit fine copper particles. The latter method is especially effective, in order to obtain a copper foil surface with a detailed surface configuration that can be applied to the current collector of the anode for secondary battery of the present invention. By reducing the copper concentration in the aqueous solution consisting mainly of sulfuric acid and copper than for regular copper plating, immersing into such an electrolyte, and performing cathode electrolysis under a current density that is slightly higher than usual in room temperature-region, fine particles of copper are generated by reduction on the surface of the copper foil, and grow according to the length of processing time (i.e., burned plating). Subsequently, regular copper plating is immediately performed using copper sulfate type electrolyte with a high copper concentration under heated temperature at regular low-to-medium current density, and the fine copper particles thus generated are firmly adhered by electrodeposition. By controlling the copper concentration, composition, and temperature of the electrolyte, as well as the current density and duration of electrolysis, etc., in the above two steps of electrolysis treatment, a copper foil for current collector with detailed surface configuration can be produced.

The active material used for the anode of the present invention, which is formed on a current collector copper foil, is constituted of a substance that mainly comprises silicon, and is a silicon-type film that contains, at least silicon. By using various CVD (chemical vapor deposition) methods, EB (electron beam) deposition methods, and sputtering methods that include reactive-type methods, which enable the formation of large-size films economically, uniform and homogeneous film can be formed on the surface of the current collector. Such silicon-type active material film must be formed on the finely-roughened surface of said copper foil current collector at a thickness by mass-per-surface area of 1 to 14 $g/m^2$ (which corresponds to about 0.5 µm to 6 µm). The lightness Y value in a XYZ colorimetric system (CIE 1931 standard colorimetric system) for the surface of the thus-obtained anode surface must be 15 to 50, and the surface roughness (ten point average roughness) Rz specified by the Japanese Industrial Standards (JIS B0601-1994 ten point average roughness) must be 1.0 µm or more and 4.5 µm or less. Thus, the effect of the present invention is essentially acquired.

Furthermore, an active material layer can be formed by applying and drying, or calcinating, a slurry, which is obtained by thoroughly mixing active material particulates with conducting agents such as carbon black, and binders such as polyimide and polyvinylidene fluoride, adding a solvent, and kneading. Such silicon-type active material layer must be formed on the finely-roughened surface of said copper foil current collector at a thickness by mass-per-surface area of 1 to 14 $g/m^2$ (which corresponds to about 0.5 µm to 6 µm). The lightness Y value in a XYZ colorimetric system (CIE 1931 standard colorimetric system) for the surface of the thus-obtained anode surface must be 45 to 75. Note that an active material layer formed by coating a slurry has a much smoother surface than the surface of the copper foil current collector, because it is formed by coating a slurry, and thus, often has a higher lightness.

The XYZ colorimetric system, which the International Commission on Illumination (CIE) defined in 1931, serves as a basis for the scientific measurement of color. However, here, only the lightness Y value among the tristimulus values XYZ is used. Colorimetry for the XYZ colorimetric system and the lightness Y value can be performed using commercially available colorimeters, etc. Although there are other colorimetric methods, such as the integrating sphere method, here, a colorimeter that adopts optical conditions in accordance to the diffused light viewing method specified in JIS Z 8722 (for example, 45° incidence 0° viewing method) is used.

As described previously, the lightness Y value in a XYZ colorimetric system may be considered an index for the surface configuration containing microscopic voids and for the size of the actual surface area. A surface, for which the lightness Y value is large, is a surface that easily reflects light that enters, and is a surface that has few irregularities on the fine surface, with open micro-voids, and thus has a small surface area. On the other hand, a surface for which the lightness Y value is small is a surface that does not reflect light that enters easily, and is thus a surface with much fine irregularities with micro-voids that are closed, and has a large surface area.

For example, when the lightness Y value of the surface of the anode, on which the film-like active material is formed by the CVD method etc., is too high, the area where the surface of the current collector substrate and the active material come in contact is small, and the adhesion between the current collector substrate and the active material deteriorate, and is thus not desirable.

That is, by controlling the lightness and the roughness of the anode surface to fall within a certain region, good adhesion between the current collector and the active material is obtained, and this anode surface configuration ensures micro sites that allow insertion and desorption of Li ions to and from the active material. Thus, the service life of the charge and discharge cycle can be maintained long.

Using a copper foil with a roughened surface on the side to which the active material is formed, which shows a lightness Y value of 10 to 40, makes it easier to acquire the above-described anode surface configuration, wherein the lightness Y values in a XYZ colorimetric system (CIE1931 standard colorimetric system) for the anode surface on which the film-like silicon-type active material layer is formed is 15 to 50, and the surface roughness Rz is 1.0 µm or more and 4.5 µm or less. Further, such a copper foil is a copper foil in which at least the active material-formation side is not smooth, or not shiny, with a surface roughness (JIS B 0601-1994 ten point average roughness) Rz of 2.0 µm or more and 5.0 µm or less. When a copper foil with a surface that is not roughened, but rather smooth or shiny, is used, part of the active material silicon film formed may exfoliate. Thus, it is desirable that the aforementioned copper foil with a roughened surface is used as the current collector substrate. Although the anode of the present invention is obtained by forming the silicon-type active material of the above-described thickness on the surface of the current collector copper foil of the present invention, it is necessary to take into consideration the relation of the roughened configuration of the current collector surface, the lightness of the surface, which serves as a parameter for the surface area, and the thickness of the silicon-type active material layer that is to be formed. That is, forming a thick active material film on the fine roughened configuration of the current collector copper foil, which has a large actual surface area, can lead to smoothing of the roughened surface, thereby increasing the lightness of the surface after active material formation, and requires precaution. For such needs that require thicker films, it is desirable that a copper foil that has large surface roughness with smaller lightness Y value be used. On the other hand, the thickness of the film to be formed is decided by taking into consideration the actual specific capacity of the secondary battery. If the active material film is too thin, the capacity becomes unrealistically small. With a film that is too thick, the surface is smoothed, making its actual surface area small, which makes the reaction site for charge and discharge and the surface area to be small, and results in the degradation of the cycle life. The minimum thickness applicable for secondary batteries of high-output usage, such as uninterruptible power source, engine starting auxiliary power, and hybrid car, can be set to about 0.5 µm, in which case, the minimum specification for the lightness Y value of surface of the copper foil can be set to about 10. As for the maximum thickness, up to about 6 µm, which can satisfy the actual capacity specification for high-energy high-capacity usage, is possible. In such case, a copper foil with a maximum lightness Y value of about 40 can be used. Furthermore, the approximate relationship between the lightness of the current collector copper foil surface and the lightness of the aforementioned active material layer for the same type of silicon-type active material film group can be recognized by taking into consideration the thickness etc. Therefore, it is designed by taking into consideration the lightness Y value of the surface of the current collector copper foil that is to be used and the thickness of the active material film to be formed, so that the lightness Y value of the surface of the aforementioned active material film that is formed is in the range of 15 to 50.

In the present invention, the anode active material film, which is formed directly on the current collector copper foil and is mainly composed of silicon, is formed as follows. One film-producing method is the CVD (chemical vapor deposition) method. For example, plasma CVD (PECVD, especially using VHF) and catalytic CVD (Cat-CVD, hot wire CVD) may be suitably applied, and LPCVD and atmospheric pressure plasma CVD are also expected to be applicable in the future. Further, it is also possible to use a vapor deposition method, and the EB (electron beam) vapor depositing method, which enables the production of large-size films, is economical and especially preferable. The silicon-made film layer produced by a CVD-type method contains hydrogenated silicon, mainly SiH or $SiH_2$, wherein one or two hydrogen(s) are bonded to the bonding sites of the silicon group. The concentration of such hydrogenated silicon is about 1 to 12 atomic %, and differ depending on the film production method and conditions such as film-production temperature and type of silicon material used, and may be controlled by the retention temperature of the substrate current collector copper foil and the type of silicon material used. In particular, in the PE-CVD method or Cat-CVD method, such concentration can be controlled by the amount of the main material, silane gas, supplied, and the supply rate of hydrogen gas. In hydrogenated silicon, by introducing hydrogen into silicon, the structure becomes superior in flexibility, as compared to that with silicon alone. Thus, it becomes possible to prevent the inhibition of ion movement and electric conduction, as well as the desorption of silicon, which is the anode active material, from the current collector due to fracture or defect occurring in the silicon film itself with the volume expansion at Li ion reception and alloying during charging. Furthermore, since with hydrogenated silicon, defects resulting from un-bonded bonding sites (dangling bonds) that inherently exist in silicon films are terminated by hydrogen, the number of unstable silicon defects is decreased and the occurrence of the aforementioned defects in electric conduction can be suppressed. The silicon-type active material is mainly composed of silicon, and comprises inevitable substances other than hydrogen. Other than for the purpose of improving certain characteristics, it is desirable that, in principle, the silicon-type active material does not contain other elements, such as alloy components. Such silicon-type active material film is formed on the surface of the above-described current collector copper foil at a thickness of 0.5 to 6 μm.

In the present invention, by adding one or more of phosphorus, oxygen, or hydrogen, or by forming a layer that contains one or more of the same, the poor conductivity of silicon is improved, and makes the alloying with silicon during charging and desorption during discharging of Li ion, as well as its movement to and from the layer, easier. Although the conductivity of the silicon-type film itself is not specified, taking into consideration such use, where instant large-output discharge is required, and the high rate conditions necessary for high-speed charging, it is desirable for the conductivity to be $10^{-2}$ S/cm or more. Phosphorus can also be doped to the silicon-type film itself, to increase conductivity.

Further, when coating a slurry to form an active material layer, it is desirable that the active material is formed on an anode current collector for secondary battery, in which at least the active material-formation side is not smooth, or not shiny, and the surface roughness (ten point average roughness) Rz is 0.6 μm or more and 3.5 μm or less, the tensile strength is 300 MPa or more and 1000 MPa or less, and the lightness Y values in a XYZ colorimetric system (CIE1931 standard colorimetric system) of the side on which the above-described silicon-type active material layer is to be formed is 20 to 50. By forming the active material layer on the current collector with the above-described features, an anode with a desirable lightness Y value and desirable surface roughness Rz, which shows higher discharge capacity and outstanding cycle characteristics, can be obtained.

In the anode of the present invention, by forming treatment layers of heat resistant, corrosion preventative, and silane-coupling properties on top of the silicon-type active material film, prevention properties for time degradation and heat-resistance to high temperatures at film-formation can be maintained, and the adhesiveness between the active material film and the current collector surface improves. Further, since the copper in the film current collector component and the active material do not diffuse to alloy, decrease in charge and discharge capacity due to such phenomenon can be prevented.

Such heat-resistant layer is a film of at least one layer, formed between the current collector copper foil and the anode active material, which prevents copper from mutually mixing with silicon, and covers the surface of the copper foil. Desirably, a heat-resistant film that contains at least nickel is formed on the surface of the copper foil. By forming a layer containing nickel, which does not diffuse to the active material and functions as a physical shielding layer, heat resistance, i.e. the prevention of the diffusion of the copper component in the current collector to the active material, due to exposure to high-temperature during silicon-type film forming and aging, can be attained. The content of nickel in the heat-resistant layer is preferably 0.01 to 0.2 $g/m^2$, since less would show inferior heat-resistance, and too much would smooth out the roughened configuration of the surface of the current collector copper foil, and reduce its adhesion to the active material. Further, the method of forming a zinc layer on the copper foil roughened surface or the nickel layer is also desirable. Zinc is diffused on top of the copper-foil surface, or exists above the copper-foil surface or the nickel film as a single layer of zinc. Zinc is easily diffused into copper and forms an alloy, or exists on nickel, and can provide heat resistance that prevents oxidization, especially heat oxidation, of copper and nickel. If the total amount is too small, such effect becomes small. If the total amount is too large, the current collectivities of copper and nickel may be reduced, or may condense between the upper films to reduce adhesiveness. Thus, the amount should preferably be in the range of 0.003 to 0.05 $g/m^2$. Although zinc gives heat resistance by diffusion to or existing on the surface of copper and nickel, as described above, if the amount of zinc is too large, it may also diffuse to the upper active material layer, and thus requires consideration. Further, the combination of forming the layer containing nickel after the formation of zinc is preferable. Note that the method of forming nickel and zinc can be selected from various methods of wet processes and dry processes. Electroplating method using known sulfate bath etc. enables the formation of uniform homogeneous film by controlling the electrolysis conditions, is economical and efficient, and can be recommended.

The anti-corrosion treatment layer that is formed on the above-described heat-resistance treatment layer is a thin layer of organic film or inorganic dielectric film that shows passivation function. The anti-corrosion treatment layer prevents the environmental decay of copper foil during current collector copper foil production to active material film formation, and also contributes to heat resistance during active material film production. As for the organic film, thin films that are obtained by immersing into aqueous solutions or alcohol-containing solvents of triazoles such as benzotriazole and tolyltriazole, which are used in copper elongation articles and rolled copper foils, as well as thiazoles, imidazoles, mercaptans, triethanolamines, are favorable. As for inorganic films, chromate thin layers, which are hydrous oxide of chromium obtained by immersion or electrolytic treatment in aqueous solutions of chromates or dichromates, are preferably used, and show high heat-resistance, unlike organic thin layers.

Furthermore, by forming a silane coupling treatment layer on top of the aforementioned anti-corrosion treatment layer, the adhesiveness of the heat-resistance treatment layer and current collector with the silicon-type active material film can be improved. Silane coupling is generally performed by immersing the current collector copper foil onto which the heat-resistance treatment layer and the anti-corrosion treatment layer is formed. As for the silane coupling agent, one may be selected according to the chemical structure of the substituent, for the heat-resistance or anti-corrosion layer. In particular, silane coupling agents of acryloxy-type and epoxy-type are recommended.

The secondary battery, which comprises the anode or anode using the current collector of the present invention, has a high capacity, and shows characteristics in that the charge-discharge capacity that is easily obtained does not deteriorate even after repeated cycles of charge and discharge. By using or adding a non-aqueous solvent containing fluoride in the electrolyte that utilizes a non-aqueous solvent constituting the secondary battery, the period during which the capacity does not deteriorate after repeated cycles of charge and discharge is prolonged, and becomes long-lasting. Since a fluoride-containing solvent mitigates the volume expansion of the silicon-type film due to its alloying with Li ion during charging, it can reduce the decrease in capacity by charge and discharge. Fluorinated ethylene carbonate, fluorinated linear carbonate, etc. can be used as the fluorine containing non-aqueous solvent. Examples of fluorinated ethylene carbonates, are mono- to tetra-fluoroethylene carbonate (4-fluoro-1,3-dioxolane-2-one, FEC), examples of fluorinated linear carbonates are methyl-2,2,2-trifluoroethyl carbonate, ethyl-2,2,2-trifluoroethyl carbonate, etc., and these may be added to the electrolyte alone or in combination. Since a fluorine group bonds readily with silicon, and is strong, it is expected that the use of fluorine will stabilize the film and contribute to inhibit expansion due to alloying with Li ion during charging. Thus, the secondary battery that utilizes the anode or the anode current collector of the present invention, along with a non-aqueous electrolyte, can be used in various industrial fields such as power supplies for mobile electronic equipments and power tools, or in areas that require high energy such as electric vehicles etc.

Hereinafter, favorable embodiments of the anode for secondary battery of the present invention are described with reference to the accompanying drawings. Note that the present invention is not limited to these embodiments.

Figure 1:
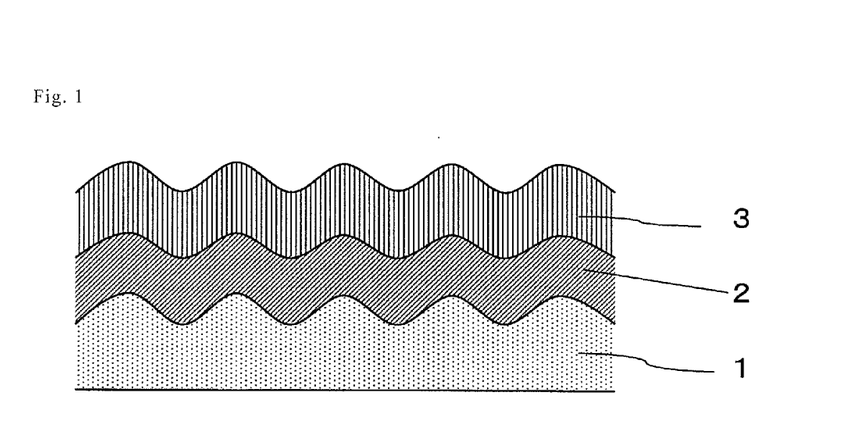
FIG. 1: an enlarged schematic sectional view that shows a 1st embodiment of the anode for secondary battery of the present invention.

FIG. 1 is an enlarged schematic sectional view showing a 1st embodiment of the anode of the present invention.

The undulating rough surface of the original current collector copper foil 1 is used as the current collector substrate as it is, without newly performing a surface roughening process. After forming a heat-resistant layer and an anti-corrosion layer or a silane coupling treatment layer 2 on this surface, the silicon-type active material film 3 is created.

Figure 2:
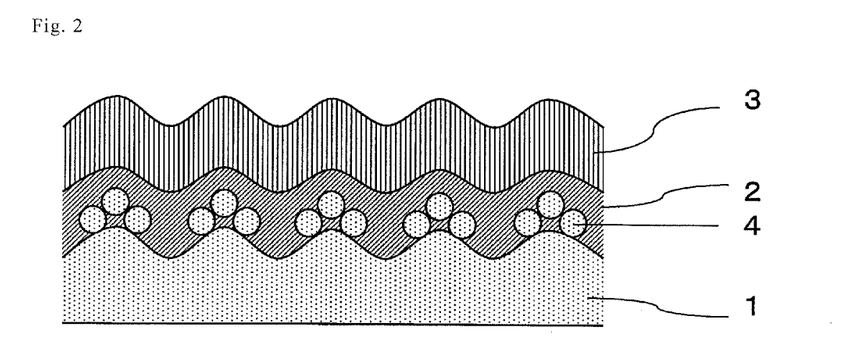
FIG. 2: an enlarged schematic sectional view that shows a 2nd embodiment of the anode for secondary battery of the present invention.

FIG. 2 is an enlarged schematic sectional view showing a 2nd embodiment of the anode of the present invention.

The undulating rough surface of the original current collector copper foil 1 is used as the current collector substrate, after performing a roughening process by copper particulates 4. After forming a heat-resistant layer and an anti-corrosion treatment layer or a silane coupling treatment layer 2 on this surface, the silicon-type active material film 3 is created.

Figure 3:
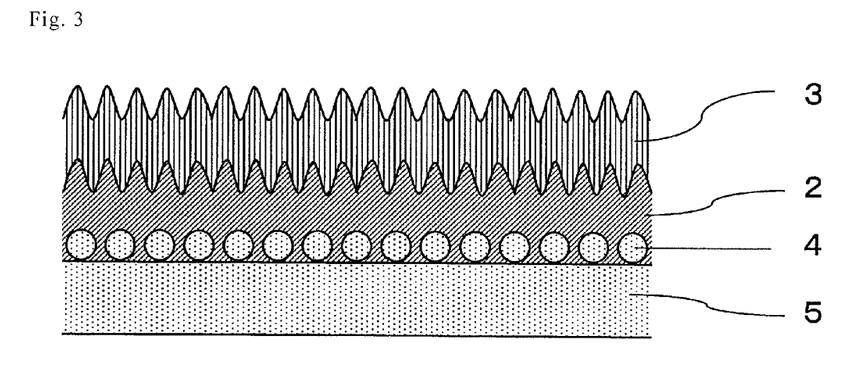
FIG. 3: an enlarged schematic sectional view that shows a 3rd embodiment of the anode for secondary battery of the present invention.

FIG. 3 is an enlarged schematic sectional view showing a 3rd embodiment of the anode of the present invention.

After performing a roughening process by copper particulates 4 on one side of the two smooth or shiny sides of the original current collector copper foil 5, it is used as the current collector substrate. After forming a heat-resistant layer and an anti-corrosion treatment layer or a silane coupling treatment layer 2 on this surface, the silicon-type active material film 3 is created.

Figure 4:
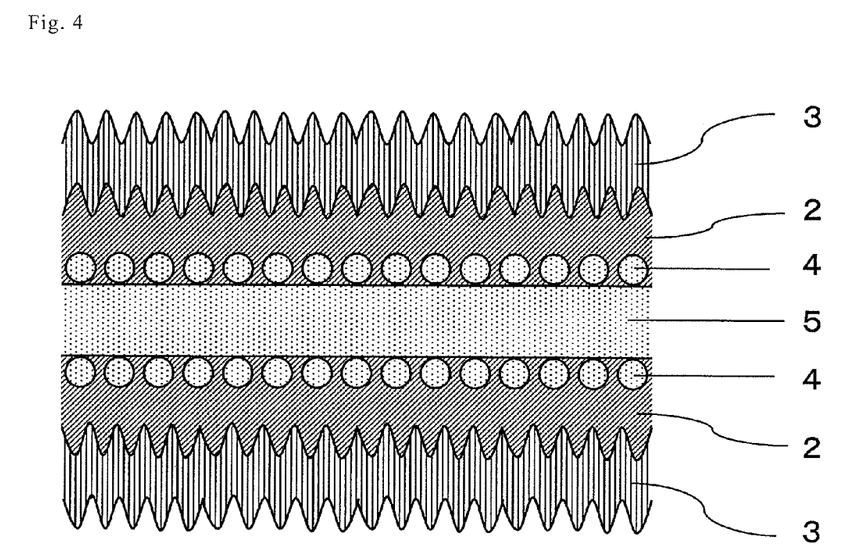
FIG. 4: an enlarged schematic sectional view that shows a 4th embodiment of the anode for secondary battery of the present invention.

FIG. 4 is an enlarged schematic sectional view showing a 4th embodiment of the anode of the present invention.

After performing a roughening process by copper particulates 4 on both sides of the two smooth or shiny sides of the original current collector copper foil 5, it is used as the current collector substrate. After forming heat-resistant layers and anti-corrosion treatment layers or a silane coupling treatment layers 2 on both surfaces, the silicon-type active material films 3 are created on both sides, and this embodiment constitutes the single-sided film composition of FIG. 3 on both sides.

In the anode for secondary batteries of the present invention shown in FIG. 1, FIG. 2, FIG. 3, and FIG. 4, because the silicon-type active material film is formed after creating the heat-resistant layer and the anti-corrosion treatment layer or silane coupling treatment layer on a copper foil, which has a predetermined rough side and constitutes the current collector substrate, the copper component in the current collector substrate does not diffuse into and alloy with the active material. Thus, high adhesiveness is obtained, and high electric capacity that is inherent to silicon is ensured during charge and discharge.

EXAMPLE

Hereinafter, the present invention will be described in detail with reference to the Examples. In this Example, the invention comprising a film on one side, as described in FIGS. 1 to 3, is shown. However, the present invention is not limited to such examples and the embodiment of FIG. 4, wherein the film formation treatment for one side is performed on both sides, may be similarly performed.

(1) Sample Preparation for the Examples and Comparative Examples

First, a test sample of the silicon-type anode of the present invention, and the anode current collector used for the same, as well as a silicon-type anode sample for comparison, were prepared as follows.

Rolled copper foil (Product of Nippon Foil Mfg. Ltd.) and electrolytic copper foil (product of Furukawa Electric Co. Ltd.) of various thicknesses were used as the original copper foil (copper foil substrate without surface treatment) for the current collector copper foil. For the rolled copper foil, a double-glossy-sided type of 12 μm was used, while for the electrolytic copper foil, a double-glossy-sided type of 12 μm and a single-glossy-sided type of 12 μm were used. To roughen the surface of these original foils, known copper plating methods in the area of copper foil for printed circuits, which utilize sulfate-copper-type aqueous solution, i.e., (a) copper particulate growth plating (the so-called burned plating method, which is performed at high electric current density around or over the critical current density) and (b) normal copper smooth plating (regular copper plating, which is performed below critical current density to prevent the adhered copper particulates from falling off) were performed. Further, as a treatment method for forming a heat-resistant layer, (c) nickel plating, using known sulfate-nickel plating solutions, or (d) zinc plating by known sulfate-zinc solutions, were performed. Moreover, as an anti-corrosion treatment, (e) immersing in benzotriazole aqueous solution, or (f) electrolysis in chromic anhydride was performed, and for silane coupling treatment, (g) immersing in an aqueous solution of silane coupling agent was performed. In order to use these copper foils as current collectors, they were stored indoors for 3 months prior to film formation of the silicon-type active material. These copper foils for current collectors were subjected to tensile tests by tensilon under room temperature and after maintaining at 180° C. for 5 minutes, and their surface roughness Rz were measured by a stylus-type surface roughness tester (product of Kosaka Laboratory Ltd.) in accordance with JIS B0601 (1994). The amount of zinc and nickel in the heat-resistant layer were measured by subjecting aqueous solutions obtained by dissolving unit areas of the sample surface films to IPC (inductively coupled plasma) emission spectroscopic analysis. The silicon-type active material film was prepared by the following methods of (h) to (l), and denoted Examples 1 to 43 and Comparative Examples 1 to 15. The silicon films were prepared by subjecting each sample to film formation for a predetermined length of time, according to the previously obtained relationship between film thickness and casting time, based on casting speed, and was confirmed by observing the SEM (electron microscope) image of the cross section of the sample after film formation. Furthermore, by measuring the mass per unit area before and after silicon film-formation, the amount of silicon, which is the anode active material, formed was obtained. (And by analyzing the formed silicon film using FT-IR (Fourier transform infrared spectroscopy), the state of hydrogen bonding was analyzed.) Also, the lightness of the surface of the current collector copper foils and the active materials were measured using an S&M colorimeter (product of Suga Test Instruments Co., Ltd.), under optical conditions (45° incidence 0° viewing) according to the diffused light viewing method specified in JIS Z 8722. The specifications of the current collector copper foils used in each sample are shown in Table 1, and any anomalies of their visual appearance after indoor storage prior to film-formation are listed in Table 2, which are both shown later.

(a) Burned plating for Roughening Treatment: In an electrolyte mainly composed of 30 g/dm$^3$ of copper and 150 g/dm$^3$ of sulfuric acid, without warming, cathode electrolysis was performed at a current density in the range of 10 to 20 A/dm$^2$, until a predetermined surface configuration was obtained, under conditions such as electrolysis time appropriately selected.

(b) Smooth Copper Plating for Roughening Treatment: In an electrolyte mainly composed of 70 g/dm$^3$ of copper and 100 g/dm$^3$ of sulfuric acid, heated to 40° C., cathode electrolysis was performed at a current density in the range of 5 to 10 A/dm$^2$, until a predetermined surface configuration was obtained, under conditions appropriately selected along with the conditions of (a).

(c) Nickel Plating Solution: Cathode electrolysis was performed under the conditions of 160 g/dm$^3$ of nickel sulfate hexahydrate, 30 g/dm$^3$ of boric acid, at 1 A/dm$^2$, for a length of time in accordance with the amount of plate formation.

(d) Zinc Plating: Cathode electrolysis was performed under the conditions of 10 g/dm$^3$ of zinc, pH 12, and 0.1 A/dm$^2$, for a length of time in accordance with the amount of plate formation.

(e) Anti-corrosion Treatment 1: Immersion in 1 wt % benzotriazole solution.

(f) Anti-corrosion Treatment 2: Cathode electrolysis was performed under the conditions of 70 g/dm$^3$ of aqueous solution of chromium trioxide, pH 12, and 1 C/dm$^2$.

(g) Silane Coupling Treatment: Immersion in 4 g/dm$^3$ of aqueous solution of an acryloxy-type silane coupling agent (product of Shin-Etsu Chemical Co., Ltd.).

(h) Method of Silicon Film Formation 1 and Phosphorous Doping to Silicon: A Cat-CVD apparatus (product of Anelva CORPORATION, discharge frequency 13.56 to 40 MHz) was used under the basic condition of 20 sccm (standard cc/min: standard condition volumetric flow rate) of mono-silane gas, a current collector temperature of 250° C., and a tungsten wire catalyst temperature of 1800° C., and the film-formation time was appropriately selected according to the film thickness. For film-formation while doping phosphorous, 10 sccm of phosphine gas was supplied along with mono-silane during film formation. Further, depending on the sample, hydrogen gas was supplied at an amount approximately equal to that of silane gas.

(i) Method of Silicon Film Formation 2: Film formation was performed using a parallel plate CVD apparatus with plasma diodes of shower-head structure (PECVD) (discharge frequency of 60 MHz), with 10% silane gas diluted with hydrogen of a supply flow rate of 100 sccm, and a current collector temperature of 200° C.

(j) Method of Silicon Film Formation 3: Using a vapor deposition apparatus with an EB (electron beam) gun and a silicon evaporation origin (product of ULVAC, Inc.), high-purity silicon was heated to sublimation at 200 W, and deposited on the current collector to form a film.

(k) Method of Silicon Film Formation 4: Using a reactive sputtering apparatus with silicon oxide and silicon of high purity, and a sputter cathode (Product of ULVAC, Inc.), 80 sccm of argon gas (sputtering gas), as well as oxygen gas as required, were supplied under an atmosphere of adjusted concentrations, and a film was formed on the current collector at a high frequency output of 1 kW.

(1) Method of Silicon Film Formation 5:

85 parts by weight of silicon powder with an average particle diameter of 5 μm (product of Kojundo Chemical Laboratory Co., Ltd.), 10 parts by weight of polyvinylidene fluoride resin (Neoflon VDF VP-850 of Daikin Industries, Ltd.) as a binder, and 225 parts by weight of N-methyl pyrrolidone as a dispersant were blended. Subsequently, the compound was stirred and mixed using a disperser, to obtain a coating slurry of the anode active material. The coating slurry of the anode active material was continuously coated on to the current collector using a die coater and dried at 100° C., to obtain an active material film on the current collector.

(2) Test Evaluation of the Samples

Next, the samples of the silicon-type anode of the present invention produced and the silicon-type anode for comparison, prepared as described previously, were subjected to the following test evaluations.

A three-electrode type cell, wherein the above-described anode sample was die-cut into 20 mm diameter to be used as the test electrode, a lithium foil was used as the counter electrode and the reference electrode, was constructed as a closed cell, with an electrolyte comprising 1M of lithium hexafluorophosphate dissolved in a solvent of ethylene carbonate (EC) and diethyl carbonate (DEC) at a volumetric ratio of 3:7, under dry atmosphere with a humidity of 7% or less, at 25° C. Note that for some, fluoroethylene carbonate (FEC) and methyl trifluoroethylcarbonate (MFEC) at a volumetric ratio of 1:3 was used as a non-aqueous electrolyte containing fluorine in part of its chemical structure. Initial charging was conducted at a constant current rate of 0.1 C, up to a potential of +0.02 V using the oxidation-reduction potential of lithium as a standard. This initial charge capacity obtained was measured for each sample, and converted to per unit mass of silicon. For the initial discharging treatment successive to this charging, discharge was conducted at a constant rate of 0.1 C, to a potential of 1.5 V, using the same lithium potential as a standard. This initial discharge capacity was also measured for each sample, and converted to per unit mass of silicon. Further, from the previously-measured film-formation mass and discharge amperage of the silicon active material, the initial discharge capacity was determined. After the initial charging-discharging treatment, charging and discharging cycles were repeated 50 times, to each of the aforementioned potential at a charging-discharging rate of 0.2 C. The discharge capacity after 50 cycles were determined for each sample, and converted to per unit mass. The initial charge-discharge capacity and the actual discharge capacity, as well as the discharge capacity after 50 cycles, for each sample are shown in Table 3.

TABLE 1

Current Collector (Copper Foil or Rolled Copper Alloy Foil)

| Number | Method and Thickness (μm) | Type of Original Foil | Roughening Treatment | Visual Observation of surface for active material formation | Surface Roughness Rz (μm) | Tensile Strength (MPa) | Heat-resistant Layer (g/m$^2$) 1st Layer Zn | 2nd Layer Ni | Anti-Corrosion Layer | Silane Coupling Treatment Layer | Lightness Y Value |
|---|---|---|---|---|---|---|---|---|---|---|---|
| Example 1 | Rolled 12 | Double-glossy-sided (FIG. 3) | On One Side | Non-glossy rough surface | 2.4 | 400 | 0.01 | 0.015 | Benzotriazole | Yes | 36 |
| Comparative Example 1 | Rolled 12 | Double-glossy-sided (FIG. 3) | On One Side | Non-glossy rough surface | 1.5 | 400 | 0.01 | 0.015 | Benzotriazole | Yes | 43 |
| Comparative Example 2 | Electrolytic 12 | Double-glossy-sided (FIG. 3) | On One Side | Non-glossy rough surface | 1.6 | 380 | 0.007 | 0.016 | Chromate | Yes | 45 |
| Example 2 | Electrolytic 12 | Double-glossy-sided (FIG. 3) | On One Side | Non-glossy rough surface | 2.0 | 400 | 0.007 | 0.016 | Chromate | Yes | 41 |
| Example 3 | Electrolytic 12 | Double-glossy-sided (FIG. 3) | On One Side | Non-glossy rough surface | 4.7 | 360 | 0.005 | 0.01 | Chromate | Yes | 24 |
| Comparative Example 3 | Electrolytic 12 | Double-glossy-sided (FIG. 3) | On One Side | Non-glossy rough surface | 5.4 | 385 | 0.005 | 0.01 | Chromate | Yes | 40 |
| Example 4 | Electrolytic 12 | Double-glossy-sided (FIG. 3) | On One Side | Non-glossy rough surface | 3.1 | 355 | 0.008 | 0.01 | Chromate | Yes | 25 |
| Example 5 | Electrolytic 12 | Double-glossy-sided (FIG. 3) | On One Side | Non-glossy rough surface | 3.1 | 355 | 0.008 | 0.01 | Chromate | Yes | 25 |
| Comparative Example 4 | Electrolytic 12 | Double-glossy-sided (FIG. 3) | On One Side | Non-glossy rough surface | 3.1 | 355 | 0.008 | 0.01 | Chromate | Yes | 25 |
| Comparative Example 5 | Electrolytic 12 | Double-glossy-sided (FIG. 3) | On One Side | Non-glossy rough surface | 3.1 | 355 | 0.008 | 0.01 | Chromate | Yes | 25 |
| Example 6 | Electrolytic 12 | Double-glossy-sided (FIG. 3) | On One Side | Non-glossy rough surface | 2.7 | 330 | 0.01 | 0.05 | Chromate | Yes | 20 |
| Example 7 | Electrolysis 12 | Double-glossy-sided (FIG. 3) | On One Side | Non-glossy rough surface | 2.5 | 330 | 0.009 | 0.02 | Chromate | Yes | 14 |
| Comparative Example 6 | Electrolytic 12 | Double-glossy-sided (FIG. 3) | On One Side | Non-glossy rough surface | 1.5 | 350 | 0.007 | 0.03 | Chromate | Yes | 9 |
| Example 8 | Electrolytic 12 | Double-glossy-sided (FIG. 3) | On One Side | Non-glossy rough surface | 3.2 | 365 | 0.008 | 0.01 | Chromate | Yes | 23 |
| Example 9 | Electrolytic 12 | Double-glossy-sided (FIG. 3) | On One Side | Non-glossy rough surface | 3.2 | 365 | 0.008 | 0.01 | Chromate | Yes | 23 |
| Example 10 | Electrolytic 12 | Double-glossy-sided (FIG. 3) | On One Side | Non-glossy rough surface | 3.2 | 365 | 0.008 | 0.01 | Chromate | Yes | 23 |
| Example 11 | Electrolytic 12 | Double-glossy-sided (FIG. 3) | On One Side | Non-glossy rough surface | 3.2 | 365 | 0.008 | 0.01 | Chromate | Yes | 23 |
| Comparative Example 7 | Electrolytic 12 | Double-glossy-sided (FIG. 3) | On One Side | Non-glossy rough surface | 3.2 | 365 | 0.008 | 0.01 | Chromate | Yes | 23 |
| Example 12 | Electrolytic 12 | Double-glossy-sided (FIG. 3) | On One Side | Non-glossy rough surface | 4.5 | 340 | 0.009 | 0.025 | Chromate | Yes | 9 |
| Comparative Example 8 | Electrolytic 12 | Double-glossy-sided (FIG. 3) | On One Side | Non-glossy rough surface | 2.0 | 340 | 0.008 | 0.009 | Chromate | Yes | 42 |
| Example 13 | Electrolytic 12 | Double-glossy-sided (FIG. 3) | On One Side | Non-glossy rough surface | 3.2 | 365 | 0.008 | 0.01 | Chromate | Yes | 23 |
| Example 14 | Electrolytic 12 | Double-glossy-sided (FIG. 3) | On One Side | Non-glossy rough surface | 3.2 | 365 | 0.008 | 0.01 | Chromate | Yes | 23 |
| Example 15 | Electrolytic 12 | Double-glossy-sided (FIG. 3) | On One Side | Non-glossy rough surface | 3.2 | 365 | 0.008 | 0.01 | Chromate | Yes | 23 |
| Example 16 | Electrolytic 12 | Double-glossy-sided (FIG. 3) | On One Side | Non-glossy rough surface | 3.2 | 365 | 0.05 | 0.008 | Chromate | Yes | 28 |
| Example 17 | Electrolytic 12 | Double-glossy-sided (FIG. 3) | On One Side | Non-glossy rough surface | 3.2 | 365 | 0.05 | 0.011 | Chromate | Yes | 28 |

TABLE 1-continued

| | Current Collector (Copper Foil or Rolled Copper Alloy Foil) | | | | | | Heat-resistant Layer (g/m²) | | | | |
|---|---|---|---|---|---|---|---|---|---|---|---|
| Number | Method and Thickness (μm) | Type of Original Foil | Roughening Treatment | Visual Observation of surface for active material formation | Surface Roughness Rz (μm) | Tensile Strength (MPa) | 1st Layer Zn | 2nd Layer Ni | Anti-Corrosion Layer | Silane Coupling Treatment Layer | Lightness Y Value |
| Example 18 | Electrolytic 12 | Double-glossy-sided (FIG. 3) | On One Side | Non-glossy rough surface | 3.2 | 365 | 0.04 | — | Chromate | Yes | 30 |
| Example 19 | Electrolytic 12 | Double-glossy-sided (FIG. 3) | On One Side | Non-glossy rough surface | 3.2 | 365 | 0.06 | — | Chromate | Yes | 32 |
| Example 20 | Electrolytic 12 | Double-glossy-sided (FIG. 3) | On One Side | Non-glossy rough surface | 3.2 | 365 | 0.004 | 0.008 | Chromate | Yes | 23 |
| Example 21 | Electrolytic 12 | Double-glossy-sided (FIG. 3) | On One Side | Non-glossy rough surface | 3.2 | 365 | 0.002 | 0.008 | Chromate | Yes | 24 |
| Example 22 | Electrolytic 12 | Double-glossy-sided (FIG. 3) | On One Side | Non-glossy rough surface | 3.2 | 365 | — | 0.008 | Chromate | Yes | 23 |
| Example 23 | Electrolytic 12 | Double-glossy-sided (FIG. 3) | On One Side | Non-glossy rough surface | 3.2 | 365 | — | 0.012 | Chromate | Yes | 25 |
| Example 24 | Electrolytic 12 | Double-glossy-sided (FIG. 3) | On One Side | Non-glossy rough surface | 3.2 | 365 | — | 0.18 | Chromate | Yes | 30 |
| Example 25 | Electrolytic 12 | Double-glossy-sided (FIG. 3) | On One Side | Non-glossy rough surface | 3.2 | 365 | — | 0.22 | Chromate | Yes | 35 |
| Example 26 | Electrolytic 12 | Double-glossy-sided (FIG. 3) | On One Side | Non-glossy rough surface | 3.2 | 365 | | — | Chromate | Yes | 22 |
| Example 27 | Electrolytic 12 | Double-glossy-sided (FIG. 3) | On One Side | Non-glossy rough surface | 3.2 | 365 | 0.01 | 0.01 | None | None | 23 |
| Example 28 | Electrolytic 12 | Double-glossy-sided (FIG. 3) | On One Side | Non-glossy rough surface | 3.2 | 365 | 0.01 | 0.01 | Chromate | None | 23 |
| Example 29 | Electrolytic 12 | Double-glossy-sided (FIG. 3) | On One Side | Non-glossy rough surface | 3.2 | 365 | 0.01 | 0.01 | None | Yes | 23 |
| Example 30 | Electrolytic 12 | Double-glossy-sided (FIG. 3) | On One Side | Non-glossy rough surface | 3.2 | 365 | 0.01 | 0.05 | Chromate | Yes | 24 |
| Example 31 | Electrolytic 12 | Double-glossy-sided (FIG. 3) | On One Side | Non-glossy rough surface | 3.2 | 365 | 0.01 | 0.05 | Chromate | Yes | 24 |
| Example 32 | Electrolytic 12 | Double-glossy-sided (FIG. 3) | On One Side | Non-glossy rough surface | 3.2 | 365 | 0.01 | 0.05 | Chromate | Yes | 24 |
| Example 33 | Electrolytic 12 | Double-glossy-sided (FIG. 3) | On One Side | Non-glossy rough surface | 3.2 | 365 | 0.01 | 0.05 | Chromate | Yes | 24 |
| Comparative Example 9 | Electrolytic 12 | Double-glossy-sided (FIG. 3) | On One Side | Non-glossy rough surface | 0.5 | 365 | 0.01 | 0.05 | Chromate | Yes | 53 |
| Example 34 | Electrolytic 12 | Double-glossy-sided (FIG. 3) | On One Side | Non-glossy rough surface | 0.6 | 365 | 0.01 | 0.05 | Chromate | Yes | 50 |
| Example 35 | Electrolytic 12 | Double-glossy-sided (FIG. 3) | On One Side | Non-glossy rough surface | 3.4 | 365 | 0.01 | 0.05 | Chromate | Yes | 20 |
| Comparative Example 10 | Electrolytic 12 | Double-glossy-sided (FIG. 3) | On One Side | Non-glossy rough surface | 3.8 | 365 | 0.01 | 0.05 | Chromate | Yes | 18 |
| Comparative Example 11 | Rolled 12 | Double-glossy-sided (FIG. 3) | On One Side | Non-glossy rough surface | 3.0 | 230 | 0.01 | 0.05 | Chromate | Yes | 23 |
| Example 36 | Rolled 12 | Double-glossy-sided (FIG. 3) | On One Side | Non-glossy rough surface | 3.3 | 900 | 0.01 | 0.05 | Chromate | Yes | 27 |
| Comparative Example 12 | Rolled 12 | Double-glossy-sided (FIG. 3) | On One Side | Non-glossy rough surface | 2.9 | 1100 | 0.01 | 0.05 | Chromate | Yes | 20 |
| Example 37 | Electrolytic 12 | Double-glossy-sided (FIG. 3) | None | Non-glossy rough surface | 4.0 | 320 | 0.01 | 0.011 | Chromate | Yes | 38 |
| Comparative Example 13 | Electrolytic 12 | Double-glossy-sided (FIG. 3) | On One Side | Non-glossy rough surface | 6.8 | 325 | 0.006 | 0.015 | Chromate | Yes | 35 |
| Example 38 | Electrolytic 12 | Double-glossy-sided (FIG. 3) | None | Non-glossy rough surface | 4.0 | 320 | 0.008 | 0.013 | Chromate | Yes | 38 |
| Comparative Example 14 | Electrolytic 12 | Double-glossy-sided (FIG. 3) | None | Shiny | 1.0 | 335 | 0.005 | 0.02 | Chromate | Yes | 95 |

TABLE 2

| Number | Visual Before Film (after 3 of indoor storage) | Active Material Film Thickness (μm) | Mass (α/m²) | Method of formation - film formation | Method of formation - slurry coating | Components other than Si | Diffusion of Current Collector Component | Film Formation Method | Surface Roughness Rz (μm) | lightness Y Value |
|---|---|---|---|---|---|---|---|---|---|---|
| Example 1 | | 2.0 | 4.7 | ○ | — | H | — | Cat-CVD | 1.1 | 45 |
| Comparative Example 1 | | 3.0 | 7.0 | ○ | — | H | — | Cat-CVD | 0.8 | 54 |
| Comparative Example 2 | | 5.0 | 11.7 | ○ | — | H | — | Cat-CVD | 0.6 | 59 |
| Example 2 | | 1.5 | 3.5 | ○ | — | H | — | Cat-CVD | 1.4 | 48 |
| Example 3 | | 1.5 | 3.5 | ○ | — | H | — | Cat-CVD | 3.5 | 36 |
| Comparative Example 3 | | 1.0 | 2.3 | ○ | — | H | — | Cat-CVD | 4.5 | 53 |
| Example 4 | | 2.5 | 5.8 | ○ | — | H | — | Cat-CVD | 2.0 | 39 |
| Example 5 | | 1.5 | 3.5 | ○ | — | H | — | Cat-CVD | 2.5 | 35 |
| Comparative Example 4 | | 6.2 | 14.4 | ○ | — | H | — | Cat-CVD | 1.5 | 55 |
| Comparative Example 5 | | 0.3 | 0.7 | ○ | — | H | — | Cat-CVD | 3.1 | 27 |
| Example 6 | | 2.2 | 5.1 | ○ | — | H | — | Cat-CVD | 2.1 | 25 |
| Example 7 | | 2.5 | 5.8 | ○ | — | H | — | Cat-CVD | 1.8 | 19 |
| Comparative Example 6 | | 0.5 | 1.2 | ○ | — | H | — | Cat-CVD | 1.2 | 13 |
| Example 8 | | 1.0 | 2.3 | ○ | — | P, O, (H) | — | Cat-CVD | 3.0 | 25 |
| Example 9 | | 2.4 | 5.6 | ○ | — | P, O, (H) | — | Cat-CVD | 2.7 | 33 |
| Example 10 | | 3.0 | 7.0 | ○ | — | slight P, O, (H) | — | Cat-CVD | 2.4 | 35 |
| Example 11 | | 5.8 | 13.5 | ○ | — | P, O, (H) | — | Cat-CVD | 1.5 | 50 |
| Comparative Example 7 | | 6.3 | 14.5 | ○ | — | P, O, (H) | — | Cat-CVD | 0.9 | 55 |
| Example 12 | | 2.5 | 5.8 | ○ | — | P, O, (H) | — | Cat-CVD | 3.0 | 33 |
| Comparative Example 8 | | 4.8 | 11.1 | ○ | — | P, O, (H) | — | Cat-CVD | 1.1 | 53 |
| Example 13 | | 2.2 | 5.1 | ○ | — | P, (H) | — | Cat-CVD | 2.4 | 31 |
| Example 14 | | 2.2 | 5.1 | ○ | — | O, (H) | — | Cat-CVD | 2.6 | 33 |
| Example 15 | | 2.0 | 4.7 | ○ | — | H | — | Cat-CVD | 2.6 | 31 |
| Example 16 | | 1.0 | 2.3 | ○ | — | H | —(Zn Particle Diffusion) | Cat-CVD | 2.8 | 36 |
| Example 17 | | 1.0 | 2.3 | ○ | — | H | — | Cat-CVD | 2.9 | 36 |
| Example 18 | | 2.0 | 4.7 | ○ | — | H | — | Cat-CVD | 2.9 | 38 |
| Example 19 | | 2.0 | 4.7 | ○ | — | H | —(Zn Particle Diffusion) | Cat-CVD | 2.7 | 40 |
| Example 20 | | 2.0 | 4.7 | ○ | — | H | — | Cat-CVD | 2.9 | 31 |
| Example 21 | | 2.0 | 4.7 | ○ | — | H | — | Cat-CVD | 2.9 | 32 |
| Example 22 | | 2.0 | 4.7 | ○ | — | H | Cu Particle Diffusion | Cat-CVD | 2.9 | 31 |
| Example 23 | | 2.0 | 4.7 | ○ | — | H | — | Cat-CVD | 2.8 | 33 |
| Example 24 | | 2.0 | 4.7 | ○ | — | H | — | Cat-CVD | 2.7 | 39 |
| Example 25 | | 2.0 | 4.7 | ○ | — | H | — | Cat-CVD | 2.7 | 46 |
| Example 26 | | 2.0 | 4.7 | ○ | — | H | Cu Diffusion Alloying | Cat-CVD | 2.9 | 29 |
| Example 27 | Brown Rust Discoloration | 2.0 | 4.7 | ○ | — | H | — | Cat-CVD | 2.8 | 28 |
| Example 28 | | 2.0 | 4.7 | ○ | — | H | — | Cat-CVD | 2.8 | 28 |
| Example 29 | Blotchy Discoloration | 2.0 | 4.7 | ○ | — | H | — | Cat-CVD | 2.8 | 29 |
| Example 30 | | 2.2 | 5.1 | ○ | — | H | — | Cat-CVD | 2.7 | 30 |
| Example 31 | | 2.2 | 5.1 | ○ | — | H | — | PECVD | 2.7 | 35 |
| Example 32 | | 2.0 | 4.7 | ○ | — | P, O | — | EB Deposition | 2.7 | 38 |
| Example 33 | | 2.0 | 4.7 | ○ | — | P, O | — | Sputtering | 2.7 | 40 |
| Comparative Example 9 | | — | 12.0 | — | ○ | O | — | Slurry Coating | 0.08 | 80 |
| Example 34 | | — | 12.0 | — | ○ | O | — | Slurry Coating | 0.2 | 75 |
| Example 35 | | — | 12.0 | — | ○ | O | — | Slurry Coating | 1.5 | 45 |
| Comparative Example 10 | | — | 12.0 | — | ○ | O | — | Slurry Coating | 2.0 | 40 |
| Comparative Example 11 | | 2.2 | 5.1 | ○ | — | P, O, (H) | — | Cat-CVD | 2.7 | 45 |
| Example 36 | | 2.2 | 5.1 | ○ | — | P, O, (H) | — | Cat-CVD | 2.7 | 45 |
| Comparative Example 12 | | 2.2 | 5.1 | ○ | — | P, O, (H) | — | Cat-CVD | 2.7 | 45 |
| Example 37 | | 2.0 | 4.7 | ○ | — | H | — | Cat-CVD | 3.4 | 48 |

TABLE 2-continued

| Number | Visual Before Film (after 3 of indoor storage) | Active Material Film Thickness (μm) | Mass (α/m²) | Method of formation - film formation | Method of formation - slurry coating | Components other than Si | Diffusion of Current Collector Component | Film Formation Method | Surface Roughness Rz (μm) | lightness Y Value |
|---|---|---|---|---|---|---|---|---|---|---|
| Comparative Example 13 | | 2.0 | 4.7 | ○ | — | H | — | Cat-CVD | 5.0 | 55 |
| Example 38 | | 2.0 | 4.7 | ○ | — | H | — | Cat-CVD | 3.4 | 48 |
| Comparative Example 14 | | Partial Pealing | — | ○ | — | H | — | Cat-CVD | — | — |

TABLE 3

| Number | Non-Solvent of Electrolyte | Initial Charge Capacity (mAh/g) | Initial Discharge Capacity (mAh/g) | Actual Discharge Capacity (mAh/g) | Discharge Capacity After 50 Charge-Discharge |
|---|---|---|---|---|---|
| Example 1 | Non-F Containing | 3,455 | 3,289 | 5.3 | 651 |
| Comparative Example 1 | Non-F Containing | 3,023 | 2,885 | 6.9 | 365 |
| Comparative Example 2 | Non-F Containing | 3,565 | 3,002 | 12.0 | 335 |
| Example 2 | Non-F Containing | 3,195 | 3,025 | 3.6 | 669 |
| Example 3 | Non-F Containing | 3,650 | 3,560 | 4.3 | 1,106 |
| Comparative Example 3 | Non-F Containing | 2,945 | 2,752 | 2.2 | 505 |
| Example 4 | Non-F Containing | 3,452 | 3,256 | 6.5 | 995 |
| Example 5 | Non-F Containing | 3,547 | 3,254 | 3.9 | 1,265 |
| Comparative Example 4 | Non-F Containing | 3,256 | 2,957 | 14.7 | 389 |
| Comparative Example 5 | Non-F Containing | 2,789 | 2,654 | 0.6 | 295 |
| Example 6 | Non-F Containing | 3,675 | 3,585 | 6.3 | 1,525 |
| Example 7 | Non-F Containing | 3,594 | 3,405 | 6.8 | 1,395 |
| Comparative Example 6 | Non-F Containing | 3,365 | 3,056 | 1.2 | 385 |
| Example 8 | Non-F Containing | 3,652 | 3,050 | 2.4 | 1,598 |
| Example 9 | Non-F Containing | 3,468 | 2,905 | 5.6 | 1,465 |
| Example 10 | Non-F Containing | 3,548 | 2,750 | 6.6 | 1,003 |
| Example 11 | Non-F Containing | 3,420 | 2,667 | 12.4 | 585 |
| Comparative Example 7 | Non-F Containing | 3,290 | 2,405 | 12.1 | 305 |
| Example 12 | Non-F Containing | 3,525 | 2,866 | 5.7 | 785 |
| Comparative Example 8 | Non-F Containing | 3,468 | 2,720 | 10.4 | 565 |
| Example 13 | Non-F Containing | 3,650 | 3,465 | 6.1 | 1,563 |
| Example 14 | Non-F Containing | 3,562 | 2,841 | 5.0 | 1,405 |
| Example 15 | Non-F Containing | 3,506 | 3,260 | 5.2 | 1,020 |
| Example 16 | Non-F Containing | 3,204 | 3,007 | 2.4 | 1,125 |
| Example 17 | Non-F Containing | 3,325 | 3,110 | 2.5 | 1,265 |
| Example 18 | Non-F Containing | 2,852 | 2,704 | 4.3 | 1,102 |
| Example 19 | Non-F Containing | 2,689 | 2,559 | 4.1 | 1,033 |
| Example 20 | Non-F Containing | 2,967 | 2,770 | 4.4 | 1,006 |
| Example 21 | Non-F Containing | 2,753 | 2,569 | 4.1 | 897 |
| Example 22 | Non-F Containing | 2,659 | 2,456 | 3.9 | 805 |
| Example 23 | Non-F Containing | 3,044 | 2,865 | 4.6 | 995 |
| Example 24 | Non-F Containing | 3,256 | 3,085 | 4.9 | 1,122 |
| Example 25 | Non-F Containing | 3,156 | 2,950 | 4.7 | 975 |
| Example 26 | Non-F Containing | 2,114 | 1,856 | 3.0 | 799 |
| Example 27 | Non-F Containing | 1,765 | 1,380 | 2.2 | 555 |
| Example 28 | Non-F Containing | 3,058 | 2,939 | 4.7 | 1,133 |
| Example 29 | Non-F Containing | 2,423 | 2,199 | 3.5 | 742 |
| Example 30 | Non-F Containing | 3,504 | 3,331 | 5.9 | 1,226 |
| Example 31 | Non-F Containing | 3,265 | 3,044 | 5.4 | 1,036 |
| Example 32 | Non-F Containing | 3,102 | 2,250 | 3.6 | 918 |
| Example 33 | Non-F Containing | 2,819 | 2,060 | 3.3 | 889 |
| Comparative Example 9 | Non-F Containing | 1,256 | 988 | 4.0 | 309 |
| Example 34 | Non-F Containing | 1,985 | 1,268 | 5.1 | 565 |
| Example 35 | Non-F Containing | 2,060 | 1,368 | 10.7 | 655 |
| Comparative Example 10 | Non-F Containing | 1,520 | 1,165 | 10.7 | 377 |
| Comparative Example 11 | Non-F Containing | 3,050 | 2,756 | 4.9 | 215 |
| Example 36 | Non-F Containing | 2,953 | 2,892 | 5.1 | 1,756 |
| Comparative Example 12 | Non-F Containing | 3,152 | 2,880 | 5.1 | (150) |
| Example 37 | Non-F Containing | 3,012 | 2,591 | 5.2 | 1,033 |
| Comparative Example 13 | Non-F Containing | 2,980 | 2,650 | 4.2 | 398 |
| Example 38 | F-Containing | 3,456 | 3,251 | 5.2 | 1,386 |
| Comparative Example 14 | — | — | — | — | — |

From the above sample preparation processes and test evaluations, the following can be said:

By comparing the initial charge capacity, discharge capacity, and the discharge capacity after 50 cycles, the charge-discharge characteristics of the samples in the Examples are favorable. For example, according to Example 1 and Comparative Example 1, which use rolled copper foil, in Comparative Example 1, where the surface roughness Rz of the current collector is 1.5 μm and small, the actual area and irregularity of the current collector surface are insufficient, making the lightness of the current collector surface high, and resulting in the capacity after 50 cycles to be lower than 400 mAh/g. It is suspected that deterioration in current collectivity etc. due to the volumetric expansion and contraction of the active material during the repetition of charge and discharge occurred. In Example 1, wherein the roughness and lightness of the current collector surface is within the specified value, the discharge capacity after 50 cycles is 600 mAh/g or more. On the other hand, in Comparative Example 2 and Example 2, which utilize electrolytic foils of double-smooth sides, even though the surface roughness and lightness of the current collector surface are out of the specified values, for Comparative Example 2, in which the lightness after film-formation is out of the specified value, the discharge capacity after cycle testing is under 400 mAh/g, but for Example 2, in which the lightness after film-formation is within the realm of the specified value, a capacity over 600 mAh/g is maintained. In Example 3, the Rz of the current collector surface is 4.7 μm, and the lightness of the surface of the current collector and the film are both within the specified value, and the discharge capacity after 50 cycles is 1000 mAh/g or more. On the other hand, in Comparative Example 3, wherein the Rz of the current collector surface is 5.4 μm and the lightness of the surface after formation of a 1 μm Si film is over 50, the initial capacity is low and the capacity after cycles is also below 600 mAh/g. However, in Examples 4 to 5, wherein the lightness is within the realm of the specified value, a capacity of around 1000 mAh/g was maintained. Furthermore, in Comparative Examples 4 to 5, wherein the current collector meets the specifications, but the thickness of the active material film is above or below the specified value, the lightness exceeded the specification, or the capacity after 50 cycles was too low because the film was too low. Further, Comparative Example 5 had an excessively low actual discharge capacity, and was unsuitable for practical use. Examples 6 to 7 were within specified values and showed good properties, but Comparative Example 6 showed low cycle capacity do to a lightness value that did not reach the specified value.

Examples 8 to 14 and Comparative Examples 7 to 8 show examples of film formation with phosphorus or oxygen and hydrogen doped in the silicon of the active material. The doped Examples showed good discharge capacities after 50 cycles, just as the non-doped Examples. However, in those Examples other than Example 13, which contain oxygen, those containing hydrogen showed low initial discharge capacity. For Comparative Examples 7 to 8, in which the lightness values deviate from the specified value, the results of the capacity after 50 cycles were low. It is suspected that deterioration in cycle characteristics occurred, due to the smoothening of the film surface configuration.

The effect of the existence of a heat-resistant layer, anti-corrosion layer, and silane coupling layer, as well as their amount, on the surface of the current collector, are shown in Examples 15 to 30. From the results of Examples 27 to 29, it can be seen that, since the active material is not necessarily formed immediately after the formation of the current collector, it is desirable that an anti-corrosion layer etc. is formed.

Further, Example 26 shows that a heat-resistant layer prevents and inhibits the diffusion of the substrate copper into the active material layer, and that its treatment amount should desirably be in the specified range.

The amount and evaluation of the nickel layer and the zinc layer formed as the heat-resistant layer can be determined by referring to Examples 15 to 26. In Example 26, where neither film is formed, the copper component in the current collector diffuse to and alloy with the active material film, causing the initial discharge capacity to be lower compared to the others at 2000 mAh/g, and the capacity after 50 cycles to be below 800 mAh/g. With a single layer of nickel, a small amount of copper diffusion remains at 0.008 $g/m^2$, as shown in Example 22, but none is observed in Example 23 with 0.012 $g/m^2$. Thus, formation at a thickness of 0.01 $g/m^2$ or more is suitable. Since film cracking may occur if it is formed too thick, and in Examples 24 to 25, decrease in capacity is observed as the number of cycles increase, the maximum thickness should be about 0.2 $g/m^2$. Examples 20 to 21 indicate that with the combination of a zinc layer of 0.003 $g/m^2$ or more, a nickel layer of 0.01 $g/m^2$ is applicable. Further, as indicated in Examples 15 to 19, when the amount of zinc is large, the active material capacity tends to decrease, due to zinc diffusion. Thus, the amount of nickel in a two layer form is desirably 0.01 $g/m^2$ or more. Further, a single layer film of high zinc content of about 0.02 to 0.04 $g/m^2$ is also effective, but if it is too much, a decrease in capacity is observed. Therefore, the maximum amount should be about 0.05 $g/m^2$. Since the sample in Example 15, which does not comprise an especially thick heat-resistant layer, shows a cycle characteristic that is normal and adequate, and a thick heat-resistant layer can be detrimental to the decrease in initial capacity, a heat-resistant layer of two well-balanced layers is preferable.

Next, the effect of anti-corrosion treatment and adhesion-improvement treatment will be discussed with reference to Examples 27 to 29, and other examples. In Example 27, rust gathered during indoor storage prior to film formation, and the charge-discharge characteristic was inferior, as well. On the other hand, in Example 28, wherein anti-corrosion treatment alone was performed, excellent charge-discharge characteristic was observed. In Example 29, wherein an adhesion-improvement treatment alone was performed, the initial charge-discharge capacity was slightly low, and blotchy discolorations were observed, but a capacity of 70 mAh/g or more was obtained after completion of cycles. Anti-corrosion and adhesion-improvement treatments should desirably be executed, in cases where long term storage is likely. Further, in Example 1, the anti-corrosion treatment by benzotriazole, which is an organic dielectric film, showed as much anti-corrosive effect as the chromate treatment layer, and indicated good charge-discharge characteristic, as well.

As for the amount of film formation for the silicon-type active material, when it is too thin, as in Comparative Example 5, the initial discharge capacity, in terms of charge-discharge value per unit mass, was small but not problematic. However, it is too small as an actual capacity, which is the absolute value of the amount of electricity needed for equipments in general. For example, it is merely one eighths of the 5 mAh necessary for various electronic devices, and a decrease in discharge capacity after cycle completion, which is presumed to be caused by irreversible capacity, is also seen. Even for high-output uses that are applicable with low per-cell capacity, a thickness of 0.5 μm or more, as in Comparative Example 6, is preferable. Furthermore, in the present invention, the reason for setting the maximum thickness of the active material film to 6 μm is because in Comparative Examples 4 and 7, wherein the films are much thicker than 6

μm, and in Comparative Example 8, wherein the roughness of the current collector is low and the film formed is thick, the specified fine surface configuration is smoothed, causing the actual surface area to decrease, and the lightness to exceed the upper limit of 50, resulting in a decrease in discharge capacity after charge-discharge cycles. Although it depends on the surface configuration of the current collector, a thickness of about 6 μm should preferably be maintained, even for an adequate current collector.

Next, the method of preparing the silicon-type active material film was examined in Examples 31 to 37. In Examples 31 to 33, wherein plasma CVD, vapor deposition, and the sputtering were applied, the discharge capacity after cycle completion remained high. However, in Comparative Example 9, Examples 34, 35, and Comparative Example 10, wherein slurry coating was performed, the lightness became high and the discharge capacity tended to be lower compared to the first three samples. When the active material film is formed on the current collector by slurry coating, the surface roughness should preferably be 0.6 to 3.5 μm, and the lightness Y value should preferably be 20 to 50.

In Comparative Example 11, Example 36, and Comparative Example 12, the tensile strength value, which is the mechanic property of the current collector copper foil, and the charge-discharge characteristic are indicated. In Example 36, which shows a value of 900 MPa, 1000 mAh/g was maintained after cycle test completion. However, in Comparative Example 11, in which the tensile strength was below 300 MPa, a low charge-discharge capacity was observed. Disassembly of the sample revealed a current collector full of wrinkles. In Comparative Example 12, wherein the tensile strength exceeded 1000 MPa, the test was interrupted. In this case, the strength was too high, and the elongation characteristic too low, that fracture of the current collector resulted from the volumetric expansion and contraction of the silicon film. Thus, as for the mechanic strength of the current collector foil, a tensile strength of about 300 to 1000 MPa is desirable.

Further, in Example 37, Comparative Example 13, and Example 38, a single-glossy-sided foil, which is a conventional print circuit foil, was used as the current collector copper foil. Among these, in Comparative Example 13, the silicon film was formed on the rough side after performing a roughening treatment. In Comparative Example 13, wherein the surface roughness was large, the lightness exceeded the specified range after active material film formation, and a decrease in capacity was observed.

In Example 38, an electrolyte comprising a non-aqueous solvent that contains fluorine was used in the three-electrode cell test. According to this example, the initial charge-discharge capacity was large, and the discharge capacity maintained after 50 cycles showed the highest result. Compared to conventional non-aqueous solvents that do not contain fluorine, the rate of volume change caused by volumetric expansion and contraction during charge and discharge, due to the alloying and de-alloying of Li ion and silicon, was minimized. Thus, the adhesiveness between the active material and the current collector, the current collectivity, and the deterioration of conductivity within the active material film, were all inhibited.

In Comparative Example 14, silicon film formation was attempted on the glossy surface of an original foil with double-glossy sides, without performing a roughening treatment. Since partial film exfoliation occurred, test evaluation could not be conducted as a sample of anode for battery.

As described in detail above, the anode of the present invention, which comprises a specific silicon-type film on a specific current collector foil, can be used as an anode that shows superior charge-discharge characteristic in secondary batteries such as lithium secondary battery, which utilize non-aqueous solvents in the electrolyte. This anode can provide properties such as high energy and high output for the use in conventional electronic devices, as well as in various industrial applications and automotive applications of secondary batteries. Moreover, since copper foils that are currently commercially produced in mass can be used as the current collector, and since the active material can be formed in a method that allows large-size film formation, it is industrially applicable under economically advantageous conditions.

DESCRIPTION OF NOTATIONS

1 current collector copper foil substrate (original foil with undulating rough surface)
2 heat-resistant layer and anti-corrosion treatment layer, or silane coupling treatment layer
3 silicon-type active material film
4 copper-type fine particles that are roughened by roughening treatment
5 current collector copper foil substrate (double-smooth-sided or double-glossy-sided foil)

The invention claimed is:
1. An anode for a secondary battery, the secondary battery comprising a non-aqueous electrolyte, the anode comprising:
  a current collector made of copper foil or copper alloy foil;
  at least one heat-resistant layer comprising at least a layer containing 0.01 to 0.2 g/m$^2$ of nickel or a layer containing 0.003 to 0.05 g/ma of zinc on one or both sides of said current collector;
  at least one layer selected from the group consisting of an anti-corrosion layer and a silane coupling treatment layer formed on said at least one heat-resistant layer; and
  a silicon-containing active material film formed on-the at least one layer selected from the group consisting of an anti-corrosion layer and a silane coupling treatment layer;
wherein:
  1 g/m$^2$ to 14 g/m$^2$ of said silicon-containing active material film is formed on said at least one layer selected from the group consisting of an anti-corrosion layer and a silane coupling treatment layer;
  said silicon-containing active material film has a surface, which is an anode surface;
  the anode surface has a lightness Y value in a XYZ CIE 1931 standard colorimetric system from 15 to 50; and
  the anode surface has a surface roughness Rz specified as a ten point average roughness by the Japanese Industrial Standards JIS B0601-1994, and Rz is 1.0 μm or more and 4.5 μm or less.

2. The anode according to claim 1, wherein said silicon-containing active material contains at least one of phosphorus or oxygen.

3. The anode according to claim 1, wherein said silicon-containing active material film further contains hydrogen.

4. The anode according to claim 1, wherein the zinc in said heat-resistant layer is diffused into said current collector.

5. The anode according to claim 1, wherein (said at least one silicon-containing active material film is formed by coating and solidifying a slurry of active material particulates and)
  a tensile strength of said current collector is 300 MPa or more and 1000 MPa or less;

said current collector has a surface lightness Y value in a XYZ CIE 1931 standard colorimetric system from 20 to 50; and said current collector has a surface roughness Rz specified as a ten point average roughness by the Japanese Industrial Standards JIS B0601-1994, and Rz is 0.6 µm or more and 3.5 µm or less.

6. The anode according to claim 1, wherein the non-aqueous electrolyte is an electrolyte solution comprising a non-aqueous solvent containing fluoride.

7. An anode for a secondary battery, the secondary battery comprising a non-aqueous electrolyte, the anode comprising:
   a current collector made of copper foil or copper alloy foil;
   at least one heat-resistant layer comprising at least a layer containing 0.01 to 0.2 g/m$^2$ of nickel or a layer containing 0.003 to 0.05 g/ma of zinc on one or both sides of said current collector;
   at least one layer selected from the group consisting of an anti-corrosion layer and a silane coupling treatment layer formed on said at least one heat-resistant layer; and
   a silicon-containing active material film formed on-the at least one layer selected from the group consisting of an anti-corrosion layer and a silane coupling treatment layer;
   wherein:
   1 g/m$^2$ to 14 g/m$^2$ of said silicon-containing active material film is formed on said at least one layer selected from the group consisting of an anti-corrosion layer and a silane coupling treatment layer;
   said silicon-containing active material film has a surface, which is an anode surface;
   the anode surface has a lightness Y value in a XYZ CIE 1931 standard colorimetric system from 15 to 50; and
   the anode surface has a surface roughness Rz specified as a ten point average roughness by the Japanese Industrial Standards JIS B0601-1994, and Rz is 1.0 µm or more and 4.5 µm or less,
   a tensile strength of said current collector is 300 MPa or more and 1000 MPa or less;
   said current collector has a surface lightness Y value in a XYZ CIE 1931 standard colorimetric system from 10 to 40; and
   said current collector has a surface roughness Rz specified as a ten point average roughness by the Japanese Industrial Standards JIS B0601-1994, and Rz is 2.0 µm or more and 5.0 µm or less.

8. A method for producing an anode for a secondary battery, comprising: providing a current collector which is made of copper foil or copper alloy foil having a tensile strength of 300 MPa or more and 1000 MPa or less;
   performing electroplating on one or both surfaces of the current collector to thereby obtain a roughened surface having a surface roughness Rz, specified as a ten point average roughness by the Japanese Industrial Standards JIS 60601-1994, which is 2.0 µm or more and 5.0 µm or less and the surface has a lightness Y value in a XYZ CIE 1931 standard colorimetric system from 10 to 40;
   forming at least one heat-resistant layer that contains at least nickel or zinc, on the roughened surface;
   forming at least one layer selected from the group consisting of an anti-corrosion layer and a silane coupling layer on top of said heat-resistant layer; and
   forming a silicon-containing active material film by forming 1 g/m$^2$ to 14 g/m$^2$ of a silicon-containing active material, optionally comprising phosphorus, oxygen, or hydrogen, on the at least one layer selected from the group consisting of an anti-corrosion layer and a silane coupling treatment layer, wherein:
   said silicon-containing active material film has a surface, which is an anode surface;
   the anode surface has a lightness Y value in a XYZ CIE 1931 standard colorimetric system from 15 to 50; and
   the anode surface has a surface roughness Rz specified as a ten point average roughness by the Japanese Industrial Standards JIS B0601-1994, and Rz is 1.0 µm or more and 4.5 µm or less.

9. The method of claim 8, wherein said silicon-containing active material film is formed by a chemical vapor deposition method, an electron beam vapor depositing method, or a sputtering method.

10. The method of claim 8, wherein said silicon-containing active material layer is formed by a slurry application-calcination method.

* * * * *